Aug. 10, 1965  K. LANG, JR  3,199,419
PROCESS AND APPARATUS FOR MAKING PLURAL RECEPTACLE CONTAINERS
Filed Jan. 2, 1962  5 Sheets-Sheet 1

INVENTOR.
BY *Karl Lang, Jr.*
*Raymond F. Kramer*
ATTORNEY

Aug. 10, 1965 K. LANG, JR 3,199,419
PROCESS AND APPARATUS FOR MAKING PLURAL RECEPTACLE CONTAINERS
Filed Jan. 2, 1962 5 Sheets-Sheet 3

INVENTOR.
KARL LANG, JR.
BY
Raymond F. Kramer
ATTORNEY

Aug. 10, 1965  K. LANG, JR  3,199,419
PROCESS AND APPARATUS FOR MAKING PLURAL RECEPTACLE CONTAINERS
Filed Jan. 2, 1962  5 Sheets-Sheet 5
Fig. 6
Fig. 7
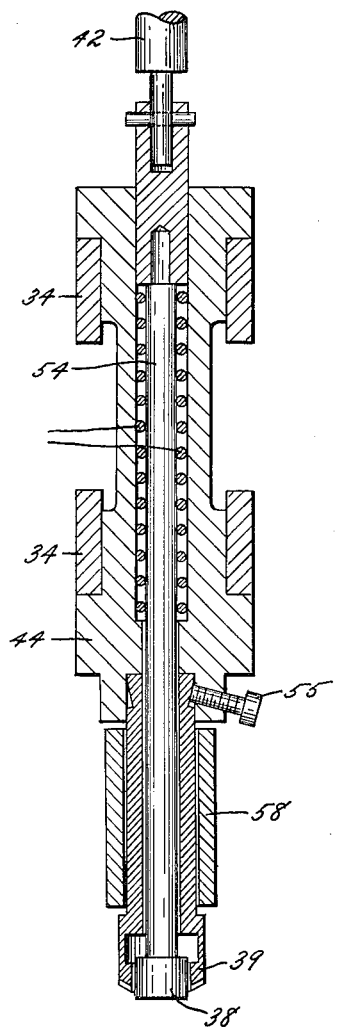
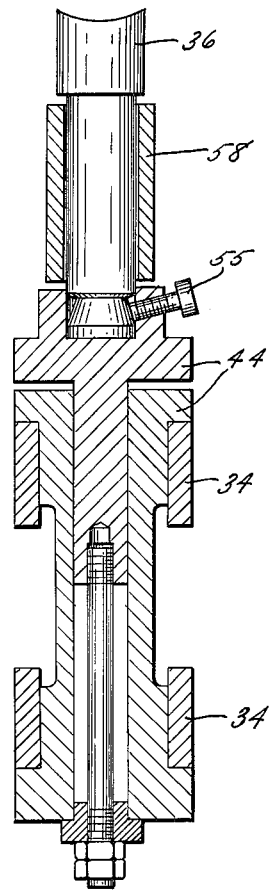
INVENTOR.
KARL LANG, JR.
BY Raymond F. Kramer
ATTORNEY

United States Patent Office 3,199,419
Patented Aug. 10, 1965

3,199,419
PROCESS AND APPARATUS FOR MAKING
PLURAL RECEPTACLE CONTAINERS
Karl Lang, Jr., Nidda, Hesse, Germany, assignor to Multi-cup Automation Company, Inc., Jamaica, N.Y., a corporation of New York
Filed Jan. 2, 1962, Ser. No. 163,712
Claims priority, application Germany, Aug. 1, 1961,
L 39,631
7 Claims. (Cl. 93—60)

This invention relates to a process for manufacturing plural receptacle containers and is especially useful in making paper packing trays or inserts which are multiply compartmented. Also within the invention are automatic machines and apparatus which may be employed in carrying out the operations of the process.

The plural receptacle containers made in accordance with the invention have been found to be greatly superior to the usual plurality of separate cups frequently employed as individual receptacles in the packing of a wide variety of articles, such as chocolates, cookies, other baked goods and candies, fruits, delicate mechanical and electrical items and other products which are subject to damage or are less attractive to the consumer, when they are not individually packed. However, before the present invention, apparatuses and processes for manufacturing the plural receptacle containers or packing inserts described, out of esthetically acceptable and commercially available foldable materials, such as paper, have not been known in the packaging art. The inherent difficulties of forming a non-yielding material into trays containing comparatively deep compartments have been substantial obstacles to the production of such trays, which obstacles have now been overcome, so that the trays can be made accurately, economically and rapidly by following the present process, preferably in conjunction with apparatus such as that hereinafter described.

In accordance with the invention there is provided a process for making a multi-compartmented or plural receptacle container or packing tray from a sheet of foldable material, such as parchment paper or glassine, which comprises moving a sheet of foldable material into a forming zone, where it is formed into a plurality of attached cup-like compartments, each of which is shallower than the desired depth of the compartments to be made. The sheet is formed into cups of this type by pressing between complementary forming dies. Then, it is advanced to another subsequent forming zone, where the material is pressed between other complementary forming dies to deepen the shallow compartments. Such procedure is repeated, with pressings between successively deepening forming dies, until a plural receptacle container of desired compartment depth is obtained. Also in accordance with the invention, apparatus is provided for automatically performing the process steps by efficient mechanical means.

The invention and the various objects and advantages thereof will be apparent from the following description of an embodiment thereof, taken in conjunction with the illustrative drawings, in which:

FIG. 6 is an enlarged central vertical section of an upper forming die, taken along plane 6—6 of FIG. 4; and FIG. 7 is an enlarged central vertical section of a lower forming die, complementary to the upper die, taken along plane 6—6 of FIG. 4.

Figure 1:
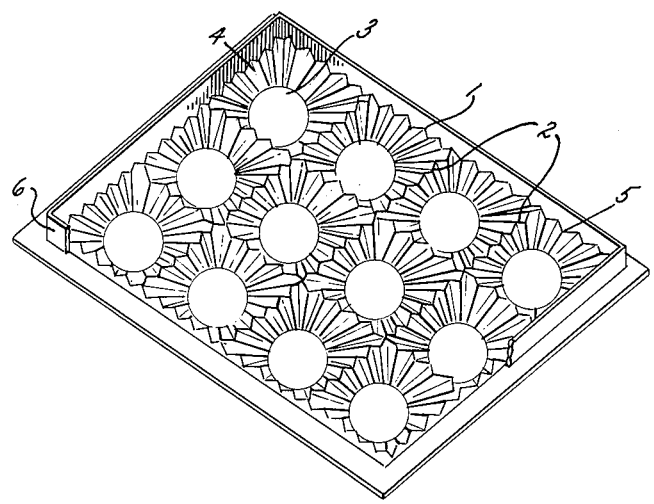
FIG. 1 is a perspective view of a plural receptacle packing tray, in position in a confectionery box bottom, part of the side walls of the box being omitted, for better illustration of the tray.

Numeral 1 designates a multi-compartmented plural receptacle container or packing insert made according to the present invention. Such inserts may be obtained of a wide variety of compartment arrangements by cutting to desired sizes and configurations the continuous strip of compartmented sheet material produced. The entire insert 1 is comprised of flat circular depressions or bottoms 3 and fluted walls 4 joined together at ridges 2. The fluted compartment walls incorporate the excess material resulting from lengthwise and transverse contraction of the sheet material as the compartments therein are formed. As shown in FIG. 1, insert 1 may be placed in a candy box or other holder 5 and candies or other items may be separately placed in the compartments of the packing tray. In some packages, depending on the height of the box wall 6, two or more layers of items may be packed in a box, utilizing a plurality of packing trays, either with or without a separating member, not shown, between trays.

The multi-compartmented packing trays made by the present processes and apparatus may be handled as units and thereby facilitate packing of boxes, assisting in both facilitating manual packaging operations and making the packing operation one which is capable of automation. The packing cups need not, as formerly, be separately inserted in a box or container. Also, the joinder of receptacles together helps to give the compartments an additional resiliency which enables them better to hold and support contents. The inserts are adaptable to boxes of a range of interior dimensions because the compartment walls can be flexed inwardly, when desired, resulting in a corresponding slight increase in height of the packing cups. This flexibility of the packing insert also causes it to press against the wall of the box in which it might be packed, holding the insert in position therein.

Figure 2:
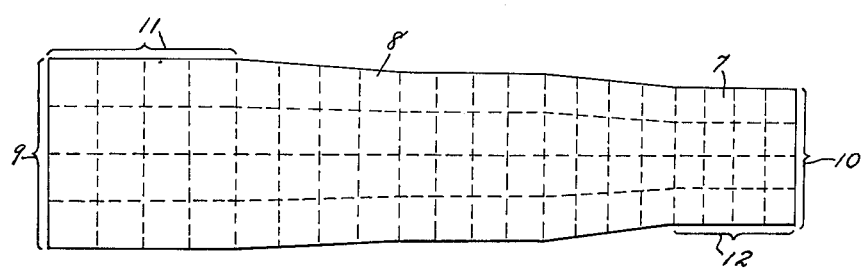
FIG. 2 is a top plan view of a sheet of paper or other foldable material, at all the stages or forming zones of the present process, showing how the paper is altered in cross-sectional area as the plural compartments are deepened in succeeding zones.

Packing insert 1 is obtained by severing the finished formed end segment 7 from sheet 8 which is formed into a sheet of plural receptacle material by machine 13. In FIG. 2 sheet 8 is illustrated running from a plurality of supply reels 56 and being converted from full width 9 to its final width 10. As previously mentioned, the transverse contraction of the sheet is accompanied by a longitudinal contraction when the desired cup shapes are being formed, which may be seen from FIG. 2 wherein segment lengths 11 and 12 are compared. Such contractions take place at each of the forming steps where the cup walls are drawn in to form a cup shape, such steps being all but the first one illustrated in FIG. 3. At the first step or bank of dies, only an embossing operation is effected, to give the paper fold lines to guide its shaping in subsequent operations. Between forming steps the paper conforms itself to the locations of the forming tools holding it, forming a sheet with tapering sides, like that shown in FIG. 2.

Figure 3:
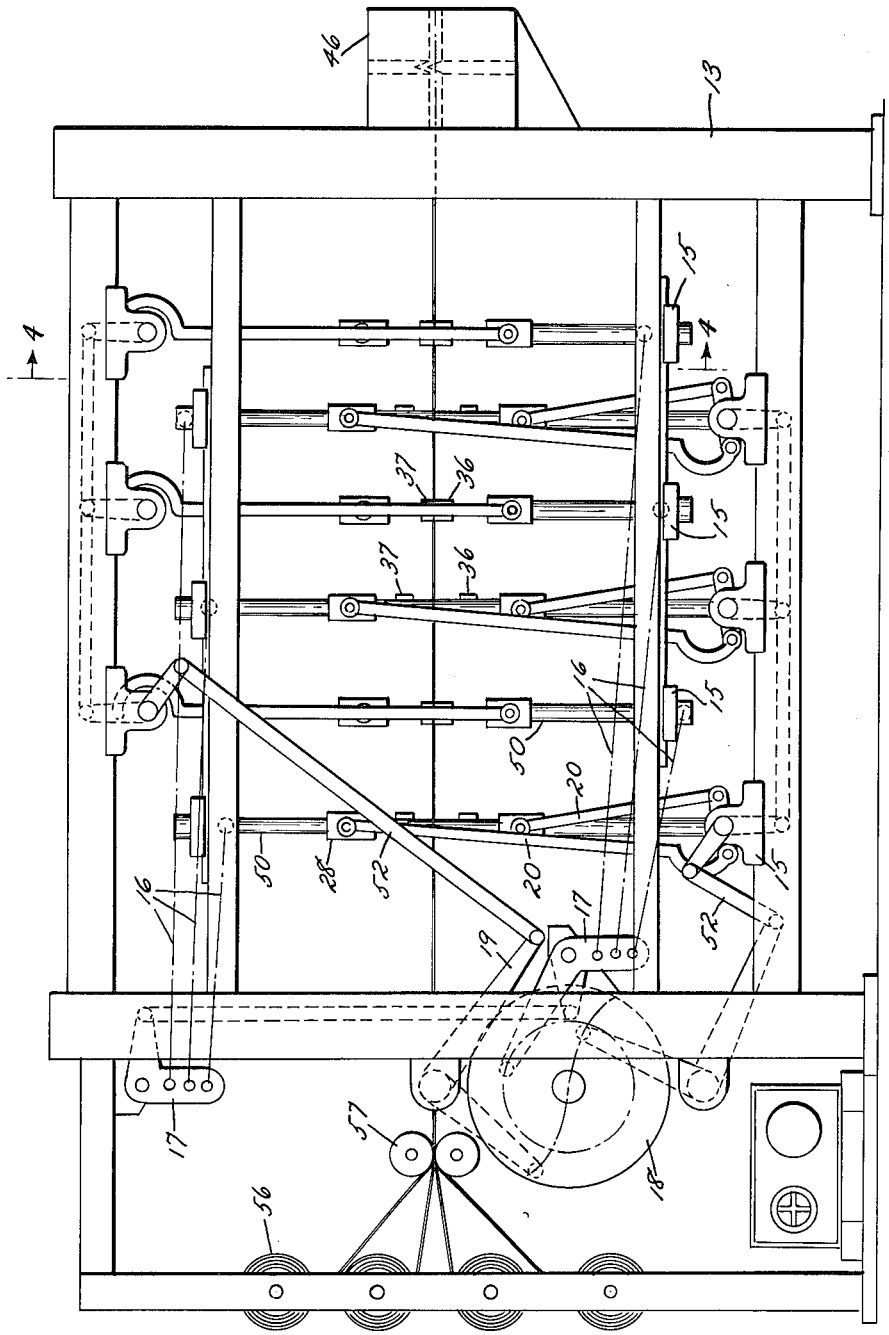
FIG. 3 is a side elevation of the apparatus.

The machine for making the present plural receptacle containers is illustrated in FIG. 3, where machine 13 contains six frames or banks 15 arranged serially in the direction of paper sheet movement. As shown, the frames or banks of forming dies are set in the machine at diminishing intervals corresponding to the longitudinal contractions of the sheet during the forming operations. Counting from the feed end of the machine, the first, third and fifth banks of dies are supported and moved from below and the second, fourth and sixth banks are suspended and actuated from above. Each set of three erected or three suspended frames operates as a unit. Although they move the paper different distances as they form it and although they have slightly different forming motions, the sets of three frames emboss or form and convey the sheet together, one set embossing and conveying while the other set has dies open and is returning them to embossing location at the beginning of the movement forward. The reciprocating oscillations of the several frames 15 is effected by suitable linkage means 16, which is driven in turn by cam 18 via crank 17.

Figure 4:
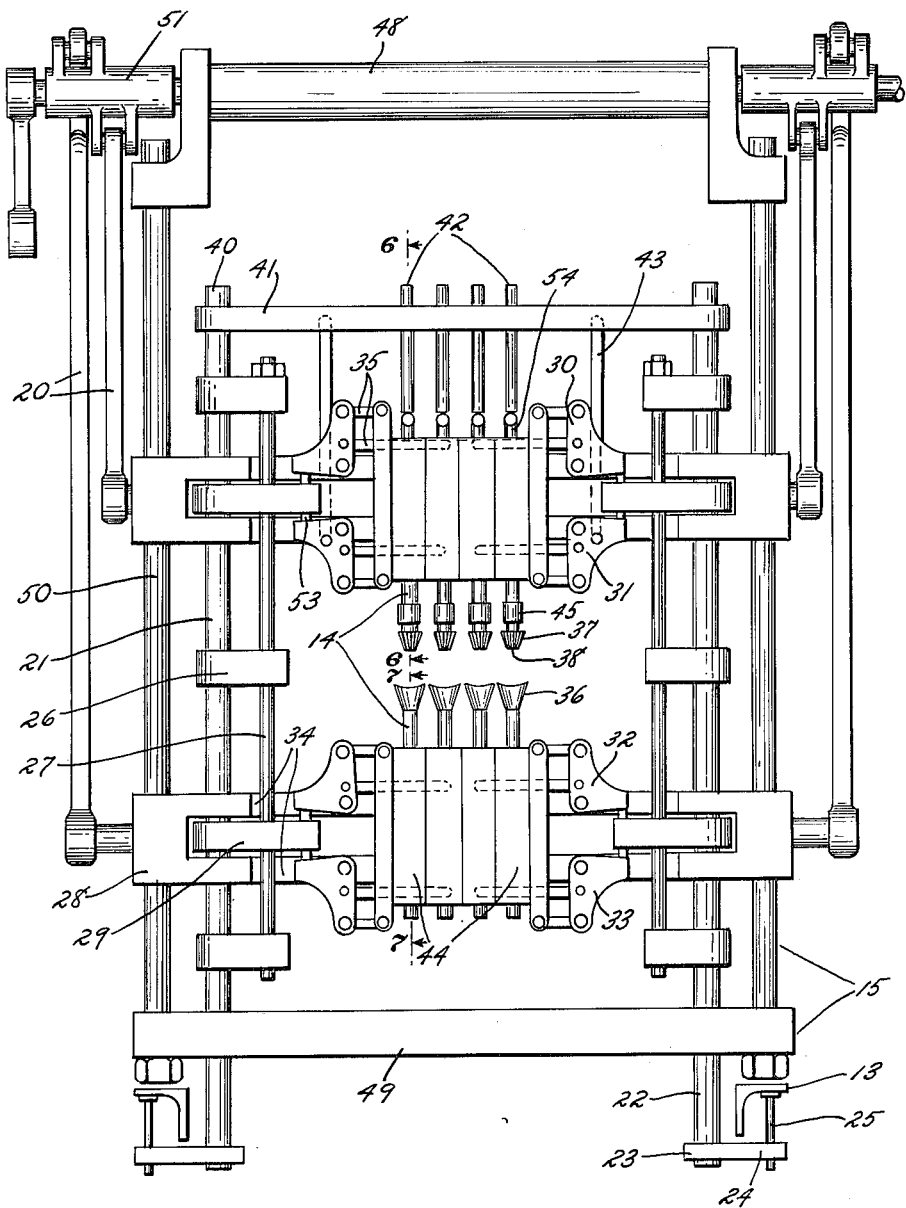
FIG. 4 is a vertical section taken along plane 4—4 of FIG. 3.
Figure 5:
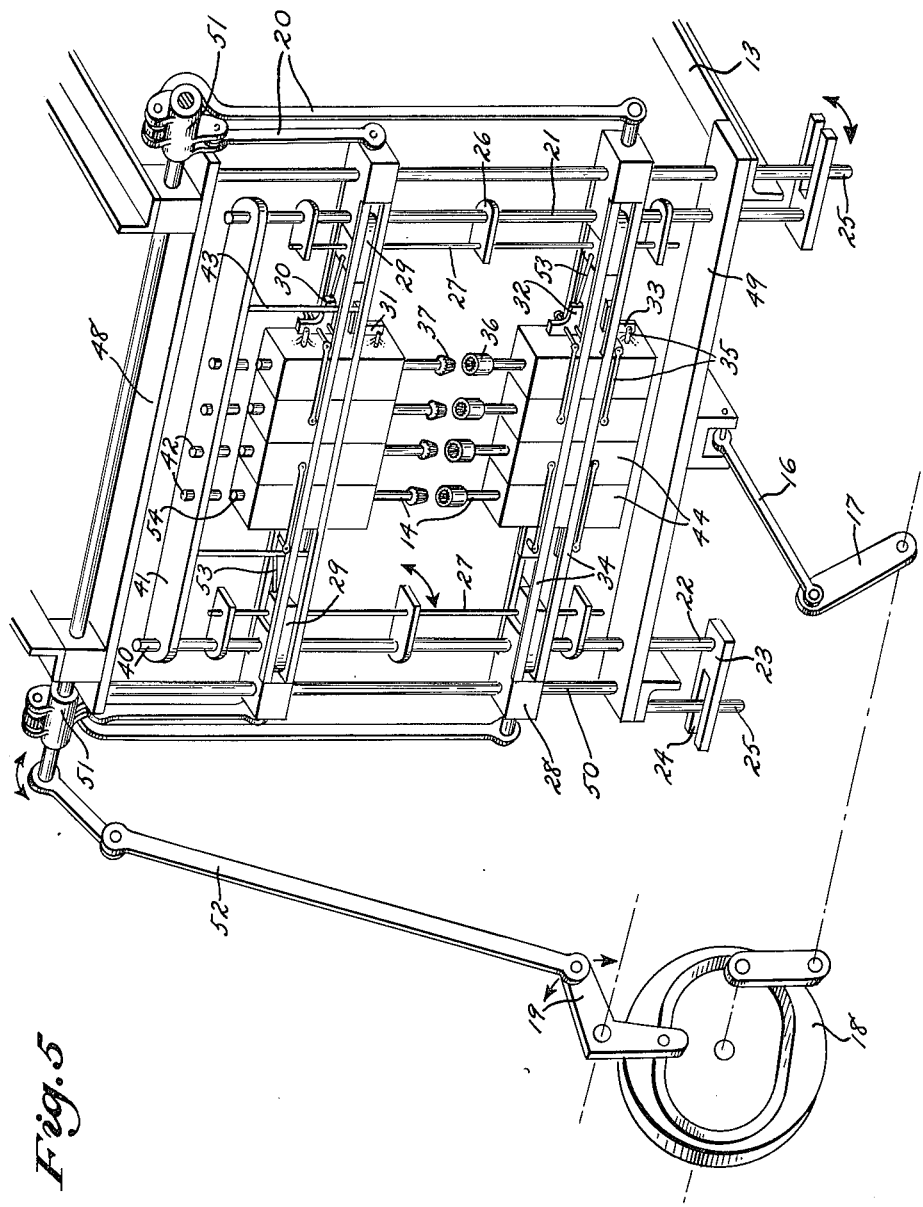
FIG. 5 is a perspective view, somewhat schematic, for purpose of better illustration, showing a blank of complementary forming dies and the mechanism for moving them.

A single frame or bank of dies will now be described in additional detail, with references to FIGS. 4 and 5. Because the upper and lower frames, the so-called suspended and erected frames, respectively, are so similar in construction, a description of one frame will serve to elucidate the invention satisfactorily. Such a frame, 15, comprises upper cross beam 48 and lower cross beam 49, with uprights 50 connecting the beams. On uprights 50 embossing tool holders 28 are slidably mounted, suspended by linkages 20, so articulated by rotatable bushing 51, provided with lever arms, that in their reciprocating oscillation they are moved towards and away from each other along uprights 50, whereby the embossing and forming operations are effected. Such movement is also introduced into the machine from cam 18 via cranks 19 and linkage 52.

In frame 15 two shafts 21 are rotatably mounted, having levers 23 provided with slots 24 at their lower ends 22. Pins 25 are rigidly attached to machine structure 13 and engage slots 24. As frame 15 is moved to and fro in the direction of paper sheet movement, pins 25 and levers 23 cause an oscillating rotation of shafts 21. Shafts 21 also have attached thereto plates 26 which hold rods 27 parallel to shafts 21. Consequently, the rods 27 follow the rotational movements of shafts 21. The embossing tool holders 28 embrace shafts 21 as well as frame uprights 50 and are forked inwardly to receive arms 29. Arms 29 are pierced or penetrated by rods 27 without positive connection and are pivoted on shafts 21. Therefore, when shaft 21 and rods 27 are rotated, arms 29 are carried along and swing in the forks of embossing tool holders 28 about shafts 21. Between the tool holders 28 on opposite sides there extend four rails 34 fixedly attached to holders 28. Between these rails 34 the individual embossing means mounts 44 are displaceably arranged. The rails 34 also support bell cranks 30, 31, 32 and 33, one arm of each of which is connected to arm 29 by member 53. Because of this arrangement, when arms 29 move, bell cranks 30, 31, 32 and 33 also make small oscillations in a perpendicular plane, which motions are transmitted by push rods 35 to embossing tool mounts 44.

The amplitudes of motions of the bell cranks 30, 31, 32 and 33 and the requisite transmission members 35 mentioned, are of such magnitude and so articulated to the bell cranks that the tool mounts 44 of any group, four in number in the illustration given, can be moved together until they touch and then can be moved apart again. Thus, there is a combination of transverse motion and longitudinal movement to compensate for the diminution of the plan area of the sheet of material as the cups are deepened by the succeeding die movements.

To the combination of movements of the synchronously moving embossing dies, both top and bottom groups, must be added still another movement, that of the central die 38 which moves downwardly an additional distance to deepen the cups after forming means in the form of dies 36 and 37 have come into contact. Upper embossing dies 37 have an outer embossing sleeve 39 through which plunger die 38 passes. In the initial embossing step, where no drawing to cup shape takes place, the plunger 38 acts to tighten up the paper, rather than to deepen it.

To have the plunger die actuated, to lag slightly behind the upper die, the following sequence of movements is effected. At the tops 40 of shafts 21 a cross beam 41 is slidably mounted, in communication with bell cranks 31 via connecting means 43. Cross beam 41 is provided with adjustable tappets 42 in contact with embossing dies 38, whose shanks 54 pass all the way through the tool mount 44 to the top and protrude beyond it. Upon lowering of the cross beam 41 with tappets 42, accomplished by connections 43 connected with bell cranks 31, the tappets press the protruding ends of the dies 38 so that they protrude a few millimeters out of sleeves 39.

In FIG. 6 is shown a complete embossing tool with mount 44 and hollow outer embossing sleeve 39, replaceable and secured by set screw 55. Sleeve 39 has forming flutes on both the annular lower face and on the side walls of the dies. In the first bank of forming means, the bottom flutes will be almost horizontal but as end banks are approached, the angle increases more closely to approximate the cup wall flutes direction. Sleeve 39 and mount 44 are both traversed by shank 54 of the upper and inner embossing means 38. The inner tool part 38 is held retracted by spring 59 from whence it is moved by depression of tappet 42.

In FIG. 7 is shown the entire bottom embossing tool. The embossing die 36 is held to the mount in the same manner as described above. By means of set screws the dies may be set to the same height. The embossing dies 36 and 37 have matching fluted side surfaces fluted so as to shape the compartments of the receptacle as may be desired. Depending on the thickness of the paper to be processed it has been found to be possible to form as many as fifty sheets of paper at a time. Usually the stock employed will be about 20 to 40 pound material. Plural sheet feeds may be arranged to feed from a plurality of supply reels 56 through a gap in intake rollers 57.

In use, it is seen that the various movements of the dies may be controlled by making adjustments of cams, lever arms, tappets and set screws, to obtain the combination movement that is needed to have a continuous paper sheet converted to plural receptacle containers or trays. After the machine is properly set for the cups to be produced, actual forming itself will be almost effortless. Thus, it is only required that the sheet of paper be fed to the first two banks of dies, which will then automatically move it to proper position for subsequent shaping operations. It has been noted that it is desirable to have a distance from 2.5 to 3.5 cup lengths (really cup diameters) between consecutive banks of dies. With such distances between operations, production of trays goes easily and at a satisfactory high speed and without the various banks or advancing mechanism being too close to one another. Heaters 58 heat the dies and cause the formed cups to hold shape. The invention has been described with respect to illustrations of a machine for effecting it. Such illustration shows only an embodiment of the invention and it is not to be considered that the invention should in any way be limited thereto.

What is claimed is:

1. An apparatus for making multi-compartmented plural receptacle containers with cup-like compartments which comprises a plurality of banks of forming dies of opposed complementary construction, the first of which banks has dies of such size and location as to form shallow cups in a sheet of paper-like material pressed between them and the subsequent banks of which apparatus are of size and location to deepen the shallow cup-like compartments to desired size, means for feeding paper-like sheet material between the banks of dies and means for moving the dies of the banks inwardly as the paper-like material is formed, to compensate for the material formed into cup walls.

2. An apparatus for making multi-compartmented plural receptacle containers with cup-like compartments which comprises a plurality of banks of complementary forming dies, the first of which has dies to form shallow cups in a sheet of paper pressed between them and subsequent banks of which apparatus have dies capable of deepening the shallow cup-like compartments when pressed together, means for feeding sheets of paper between the banks of dies in order to produce a consecutively deepened compartment and means for moving the dies of the banks inwardly and forwardly as the compartments are formed, to compensate for the material formed into cup walls and to advance the material for the succeeding operations.

3. An apparatus according to claim 2 in which the dies have heating means associated with them, which heating means raise the surfaces of the dies to a suitable temperature for forming the paper sheets into compartmented receptacles.

4. An apparatus according to claim 2 in which the forming dies have fluted forming surfaces to produce fluted cup-like compartmented plural receptacle containers of superior strength.

5. An apparatus according to claim 4 in which the various pairs of complementary dies include male and female dies, the former having embossing sleeve portions and central die portions coaxially movable with respect to the sleeves.

6. An apparatus according to claim 4 in which the banks of dies are replaceable to adapt the machine for the production of other multi-compartmented receptacles of different size.

7. An apparatus according to claim 1 in which alternate banks of forming dies are coordinated to form the paper-like material at the same time.

References Cited by the Examiner
UNITED STATES PATENTS

| | | | |
|---|---|---|---|
| 957,159 | 5/10 | Heiser | 93—84 |
| 1,473,387 | 11/23 | Simmons | 93—60 |
| 1,534,100 | 4/25 | Elwell | 93—60 |
| 1,904,268 | 4/33 | Bronson. | |
| 2,026,403 | 12/35 | Schlemmer | 93—60 |
| 2,377,097 | 5/45 | Norris. | |
| 2,655,196 | 10/53 | Magnani | 156—585 |
| 2,928,221 | 3/60 | Smith. | |

FRANK E. BAILEY, *Primary Examiner.*